July 24, 1951 — R. W. MILLER — 2,562,055
HOSE FERRULE CLAMPING PLIERS
Filed Nov. 26, 1948
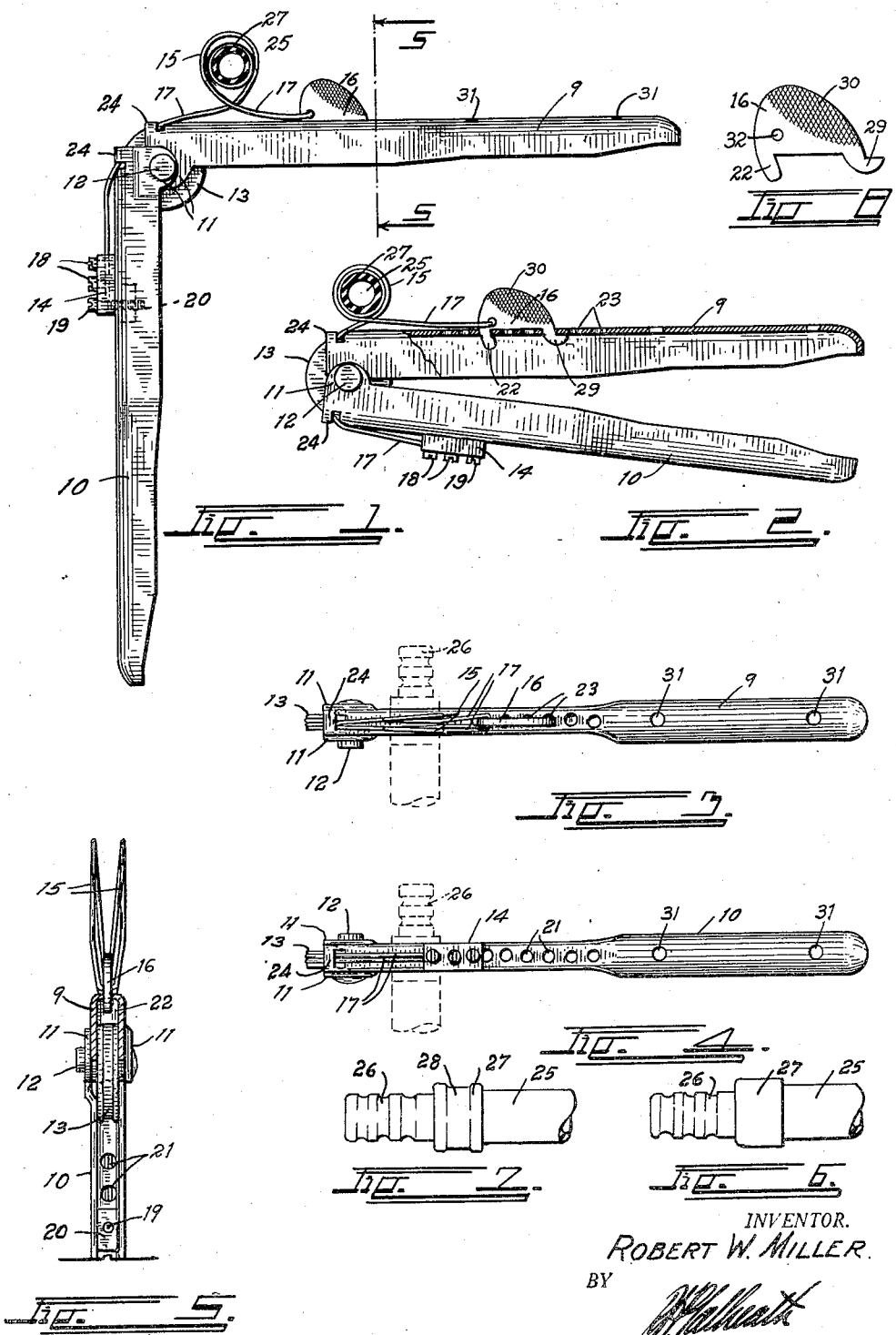
INVENTOR.
ROBERT W. MILLER.
BY
ATTORNEY.

Patented July 24, 1951

2,562,055

UNITED STATES PATENT OFFICE 2,562,055

HOSE FERRULE CLAMPING PLIERS

Robert W. Miller, Denver, Colo.

Application November 26, 1948, Serial No. 62,140

8 Claims. (Cl. 81—15)

This invention relates to a tool for contracting or clamping metal ferrules on the extremities of lengths of flexible hose for securing couplings and fittings therein.

The principal object of the invention is to provide a simple, plier-like hand tool which will exert exceedingly great pressure on the ferrule uniformly throughout its entire circumference so as to form an indented groove therein and in the hose completely around the ferrule, with a single, effortless hand operation.

The invention is designed more particularly as an improvement over the hose ferrule clamping machine illustrated and described in applicant's co-pending application, Serial No. 694,629, now Patent No. 2,483,659.

Another object of the invention is to so construct the tool that it can be quickly and easily adjusted to accommodate hose of various diameters.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved ferrule clamping tool in the open position;

Fig. 2 is a similar view of the tool in the closed position;

Fig. 3 is a top view thereof;

Fig. 4 is a bottom view thereof;

Fig. 5 is a cross-section, taken on the line 5—5, Fig. 1;

Fig. 6 is a side view of a typical hose coupling and ferrule before using the improved tool;

Fig. 7 is a similar view, illustrating the appearance of the ferrule after being contracted by means of the improved tool; and Fig. 8 is a detail view, illustrating an adjustable attachment clip employed in the improved tool.

The tool consists of two exactly similar handle members 9 and 10, preferably stamped from sheet metal to form a U-shaped cross-section. The handle members are formed with ears 11 at their one extremity which overlap to receive a hinge pin 12, by means of which the two handle members are hingedly secured together. A grooved wheel 13 is mounted on the pin 12 between the opposite pairs of overlapping ears 11 so as to be freely rotatable therebetween.

A single length of steel wire 17, such as music wire, extends from a wire-clamping block 14 on the handle 10 about the wheel 13, thence around a loose, contractable loop 15, thence through an anchor clip 16, from whence it returns about the loop and over the wheel to the clamping block 14. The two extremities of the wire 17 are clamped in the block 14 by means of a pair of set screws 18. The two adjacent lengths of wire 17 are guided into the groove in the wheel 13 by means of wire guide loops 24 formed on the hinged extremities of the handles 9 and 10.

The block 14 is clamped to the handle 10 by means of a clamp screw 19 which is threaded into a loose clamping block 20 on the inside of the handle 10. The screw 19 may be positioned in any desired one of a plurality of adjustment holes 21. The anchor clip 16 is stamped from sheet metal and is provided with a forward fang 22 and a rearward, hooked fang 29. The fangs 22 and 29 may be positioned in any desired pair of adjacent holes of a plurality of spaced-apart holes 23 formed in the handle 9.

In Figs. 6 and 7 the extremity of a conventional hose is indicated at 25. A hose coupling 26 is forced into the extremity of the hose 25, and a ferrule 27 is slipped over the extremity of the hose. The ferrule is contracted upon the hose by placing it in the loop 15 of the wire 17 while the tool is in the open position of Fig. 1.

The two handles 10 are then forced toward each other, as shown in Fig. 2. This draws the wire 17 over the wheel 13, exerting a tension thereon to constrict the loop 15 about the ferrule 27. The force of the constriction is sufficient to form a circumferential groove 28, see Fig. 7, in the ferrule to rigidly clamp it to the hose 25.

The purpose of the holes 21 is to preset the tool for use on a given size of hose. If the screw 19 be moved into a hole toward the hinge pin 12, the loop 15 will be enlarged for the larger size hoses, and if moved into a hole toward the extremity of the handle 10, the loop will be constricted for the smaller size hose.

The clip 16 allows the loop 15 to be placed over hoses where it is not possible to slip the loop over the extremity of the hose. In such a case, the clip is gripped between the thumb and finger, a roughened gripping surface 30 being provided, and the fang 22 is lifted from its hole 23. This allows the rear, hooked fang to be removed by sliding the clip forwardly. The clip is then passed between the two side wires of the loop 15 to open the latter so that it may be passed around the hose. The clip is then returned through the side wires of the loop and the fangs 22 and 29 are inserted into two adjacent holes 23. Tension on the wire tends to tilt the clip forwardly. Forward tilting, however, is prevented by the hooked rear fang 29.

It is preferred to place openings 32 in both the handles 9 and 10 so that either handle may be attached to a supporting table or other surface by means of suitable screws, so that only one handle will be necessary to operate the device.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tool for contracting hose ferrules comprising: two handle members; a hinge pin joining an extremity of one of said handle members to an extremity of the other handle member together; and a length of wire secured at each extremity to one of said handle members and extending around said hinge pin, there being a loose loop formed in said wire opposite one of said handle members for receiving a ferrule.

2. A tool for contracting hose ferrules comprising: two handle members; a hinge pin joining an extremity of one of said handle members to an extremity of the other handle member together; a wheel mounted on said hinge pin; and a length of wire secured at its extremities to said handle members and extending from one handle member to the other about said wheel, there being a loose loop formed in said wire for receiving a hose ferrule.

3. A tool for contracting hose ferrules comprising: two handle members; a hinge pin joining an extremity of one of said handle members to an extremity of the other handle member together; a wheel mounted on said hinge pin; a length of wire secured at its extremities to said handle members and extending from one handle member to the other about said wheel, there being a loose loop formed in said wire for receiving a hose ferrule; and a wire guide member formed on each handle member adjacent said wheel and acting to guide said wire onto said wheel.

4. A tool for contracting hose ferrules comprising: two similar handle members having a U-shaped cross-section; a pair of ears formed on one extremity of each handle member, the ears of one handle member overlapping the ears of the other handle member; a hinge pin extending through all of said ears; a grooved wheel mounted on said hinge pin between the overlapped pairs of ears; and a flexible wire secured at its extremities to said handle members and extending from one handle member to the other handle member, said wire passing over said wheel and having a loose loop formed therein to receive a ferrule so that when said handle members are moved inwardly toward each other, said wire will be pulled over said wheel to contract said loop.

5. A tool for contracting hose ferrules comprising: two similar handle members having a U-shaped cross-section; a pair of ears formed on one extremity of each handle member, the ears of one handle member overlapping the ears of the other handle member; a hinge pin extending through all of said ears; a grooved wheel mounted on said hinge pin between the overlapped pairs of ears; a flexible wire secured at its extremities to said handle members and extending from one handle member to the other handle member, said wire passing over said wheel and having a loose loop formed therein to receive a ferrule so that when said handle members are moved inwardly toward each other, said wire will be pulled over said wheel to contract said loop; and a wire guide formed on said one extremity of each handle member and extending over said wire to retain the latter on said wheel.

6. A tool for contracting hose ferrules comprising: two similar handle members having a U-shaped cross-section; a pair of ears formed on one extremity of each handle member, the ears of one handle member overlapping the ears of the other handle member; a hinge pin extending through all of said ears; a grooved wheel mounted on said hinge pin between the overlapped pairs of ears; a flexible wire secured at its extremities to said handle members and extending from one handle member to the other handle member, said wire passing over said wheel and having a loose loop formed therein to receive a ferrule so that when said handle members are moved inwardly toward each other, said wire will be pulled over said wheel to contract said loop; a wire guide formed on said one extremity of each handle member and extending over said wire to retain the latter on said wheel; and means on each handle member for securing the extremities of said wire at any of a plurality of points along said handle members.

7. A tool for contracting hose ferrules upon hose, comprising: two handle members; a hinge pin hingedly securing an extremity of one of said handle members to an extremity of the other handle member; a grooved wheel mounted on said hinge pin between the adjacent extremities of said handle members; a length of steel wire bent back upon itself to form a double strand having a U-shaped bend at one extremity, and its free ends at the other extremity; means securing said free ends to the outside of one handle member; a clip normally positioned at the U-shaped extremity of said strand, said strand extending from its secured extremity around said wheel, thence being curved into a substantial circle to form a loose loop for receiving said ferrule, thence extending along the outside of the other handle member to said clip; and fangs formed on said clip adapted to detachably engage in openings formed in the latter handle member.

8. A tool for contracting hose ferrules upon hose, comprising: two handle members; a hinge pin hingedly securing an extremity of one of said handle members to an extremity of the other handle member; a grooved wheel mounted on said hinge pin between the adjacent extremities of said handle members; a length of steel wire bent back upon itself to form a double strand having a U-shaped bend at one extremity, and its free ends at the other extremity; means securing said free ends to the outside of one handle member; a clip normally positioned at the U-shaped extremity of said strand, said strand extending from its secured extremity around said wheel, thence being curved into a substantial circle to form a loose loop for receiving said ferrule, thence extending along the outside of the other handle member to said clip; and fangs formed on said clip adapted to detachably engage in openings formed in the latter handle member, one of said fangs being relatively straight and adapted to extend into an opening adjacent said ferrule, the other of said fangs being hooked and adapted to extend into a second opening distant from said ferrule.

ROBERT W. MILLER.

REFERENCES CITED

The following references are of record in the file of this patent:

UNITED STATES PATENTS

| Number | Name | Date |
|---|---|---|
| 2,483,659 | Miller | Oct. 4, 1949 |

FOREIGN PATENTS

| Number | Country | Date |
|---|---|---|
| 70,517 | Switzerland | Oct. 1, 1915 |
| 82,100 | Switzerland | Sept. 1, 1919 |